(12) United States Patent
Umezawa et al.

(10) Patent No.: US 11,254,177 B2
(45) Date of Patent: Feb. 22, 2022

(54) HOLLOW COIL SPRING AND SUSPENSION DEVICE FOR VEHICLE

(71) Applicant: NHK SPRING CO., LTD., Yokohama (JP)

(72) Inventors: Masahiro Umezawa, Yokohama (JP); Daisuke Takeda, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 61 days.

(21) Appl. No.: 16/145,094

(22) Filed: Sep. 27, 2018

(65) Prior Publication Data

US 2019/0030973 A1    Jan. 31, 2019

Related U.S. Application Data

(63) Continuation of application No. PCT/JP2017/013096, filed on Mar. 29, 2017.

(30) Foreign Application Priority Data

Mar. 30, 2016 (JP) .............................. JP2016-068042

(51) Int. Cl.
*B60G 11/16* (2006.01)
*F16F 1/06* (2006.01)
(Continued)

(52) U.S. Cl.
CPC ................ *B60G 11/16* (2013.01); *F16F 1/06* (2013.01); *F16F 1/12* (2013.01); *F16F 1/126* (2013.01);
(Continued)

(58) Field of Classification Search
CPC ...... F16F 1/04; F16F 1/042; F16F 1/06; F16F 1/08; F16F 1/12; F16F 1/125; F16F 1/126;
(Continued)

(56) References Cited

U.S. PATENT DOCUMENTS 2,406,059 A * 8/1946 Burch .................. B21D 41/045
228/173.2
2,408,596 A * 10/1946 Bednar ................ B21D 41/045
72/69
(Continued)

FOREIGN PATENT DOCUMENTS

DE    102011002065 A1    10/2012
EP        2647449 A1    10/2013
(Continued)

OTHER PUBLICATIONS

International Search Report (ISR) dated Jun. 13, 2017 issued in International Application No. PCT/JP2017/013096.
(Continued)

*Primary Examiner* — Thomas J Williams
(74) *Attorney, Agent, or Firm* — Holtz, Holtz & Volek PC (57) ABSTRACT

A hollow coil spring is made of a hollow wire in which a terminal sealed portion is formed on an end portion of the wire. The terminal sealed portion has a rotationally symmetric shape in which an axis passing through the center of the wire is the symmetric axis. The hollow coil spring includes an end wall portion, and an end face arc-shaped curved surface. The end wall portion includes an end face perpendicular to the axis. A distal-end-center closure portion is formed on the axis at the center of the end wall portion. A spring seat includes a base member and a sheet member. An end turn portion of the hollow coil spring is in contact with the sheet member. The end face of the end turn portion is opposed to a stopper wall of the spring seat.

2 Claims, 5 Drawing Sheets

(51) Int. Cl.
  *F16F 1/12* (2006.01)
  *B21D 41/04* (2006.01)
  *B21K 21/14* (2006.01)
  *F16F 9/32* (2006.01)

(52) U.S. Cl.
  CPC ............... *F16F 9/32* (2013.01); *B21D 41/04* (2013.01); *B21K 21/14* (2013.01); *B60G 2202/12* (2013.01); *B60G 2204/124* (2013.01); *B60G 2206/426* (2013.01); *B60G 2206/724* (2013.01); *F16F 2224/0208* (2013.01); *F16F 2230/0005* (2013.01); *F16F 2234/02* (2013.01)

(58) Field of Classification Search
  CPC ......... F16F 2238/026; F16F 2230/0005; F16F 2226/048; B60G 11/14; B60G 11/15; B60G 11/16; B60G 2202/12; B60G 2204/124; B60G 2204/1242; B60G 2206/426; B21D 41/04; B21K 21/14
  USPC ................. 267/221, 226, 160, 166.1, 167
  See application file for complete search history.

(56) References Cited

U.S. PATENT DOCUMENTS

| | | | |
|---|---|---|---|
| 4,429,899 A | | 2/1984 | Ohno et al. |
| 4,627,257 A | | 12/1986 | McElhaney |
| 4,628,704 A | | 12/1986 | Kilby |
| 5,085,131 A | * | 2/1992 | Barrett ................ B21D 22/14 228/60 |
| 6,154,961 A | | 12/2000 | Park et al. |
| 7,861,706 B2 | * | 1/2011 | Bellomo ................ F24C 3/12 126/39 N |
| 9,145,941 B2 | | 9/2015 | Yajima et al. |
| 9,482,302 B2 | | 11/2016 | Toyotake et al. |
| 10,105,746 B1 | | 10/2018 | Wilson et al. |
| 2007/0216126 A1 | | 9/2007 | Lopez et al. |
| 2013/0292890 A1 | * | 11/2013 | Yajima ................ B21D 22/14 267/166 |
| 2014/0225319 A1 | | 8/2014 | Schüssler et al. |
| 2014/0265081 A1 | * | 9/2014 | Nakano ................ B60G 11/16 267/220 |
| 2015/0176101 A1 | | 6/2015 | Ishitsuka et al. |
| 2015/0184267 A1 | | 7/2015 | Koshita et al. |
| 2019/0030979 A1 | * | 1/2019 | Umezawa ............ B60G 21/055 |
| 2019/0030980 A1 | * | 1/2019 | Tange ...................... F16F 1/02 |

FOREIGN PATENT DOCUMENTS

| | | |
|---|---|---|
| JP | 56158538 U | 11/1981 |
| JP | 57020507 U | 2/1982 |
| JP | 59011010 U | 1/1984 |
| JP | 59160929 U | 10/1984 |
| JP | 07012160 A | 1/1995 |
| JP | 2004290987 A | 10/2004 |
| JP | 2005256964 A | 9/2005 |
| JP | 2007127227 A | 5/2007 |
| JP | 2012117612 A | 6/2012 |
| JP | 2013185670 A | 9/2013 |
| JP | 2014043922 A | 3/2014 |
| JP | 2015047978 A | 3/2015 |
| KR | 1996-0002271 U | 1/1996 |
| KR | 20120037586 A | 4/2012 |
| KR | 1020120037591 A | 4/2012 |
| KR | 101459277 B1 | 11/2014 |
| WO | 2012073786 A1 | 6/2012 |
| WO | 2013175821 A1 | 11/2013 |

OTHER PUBLICATIONS

Written Opinion dated Jun. 13, 2017 issued in International Application No. PCT/JP2017/013096.
Extended European Search Report (EESR) dated Oct. 29, 2019 issued in European Application No. 17775323.3.
Office Action (Non-Final Rejection) dated Mar. 18, 2020 issued in related U.S. Appl. No. 16/145,037.
Related U.S. Appl. No. 16/145,037; First Named Inventor: Masahiro Umezawa; Title: "Hollow Spring Member"; filed: Sep. 27, 2018.
Office Action (Final Rejection) dated Aug. 3, 2020, issued in related U.S. Appl. No. 16/145,037.

\* cited by examiner

HOLLOW COIL SPRING AND SUSPENSION DEVICE FOR VEHICLE

CROSS-REFERENCE TO RELATED APPLICATIONS

This application is a Continuation Application of PCT Application No. PCT/JP2017/013096, filed Mar. 29, 2017 and based upon and claiming the benefit of priority from prior Japanese Patent Application No. 2016-068042, filed Mar. 30, 2016, the entire contents of all of which are incorporated herein by reference.

BACKGROUND OF THE INVENTION

1. Field of the Invention

The present invention relates to a hollow coil spring capable of contributing to reducing the weight of a suspension for a vehicle such as a car, and a vehicle suspension comprising the hollow coil spring.

2. Description of the Related Art

The suspension for a vehicle such as a car comprises a coil spring, an upper spring seat, and a lower spring seat. The upper spring seat supports an upper end of the coil spring. The lower spring seat supports a lower end of the coil spring. The coil spring is compressed between the lower spring seat and the upper spring seat. Further, the coil spring extends and retracts in accordance with the magnitude of a load applied between the lower spring seat and the upper spring seat. In order to reduce fuel consumption of a vehicle, or enhance the driving performance, there is an increasing demand for reducing the weight of vehicles. A coil spring which constitutes the suspension is not an exception, and reducing the weight of the coil spring is an inevitable requirement.

As the means for reducing the weight of a coil spring, Patent Literature 1 (JP 2007-127227 A) describes a hollow coil spring using a hollow wire. In the hollow coil spring of Patent Literature 1, an opening at a distal end of the wire is closed by a cap, which is a part separate from the wire. Accordingly, when the distal end of the wire is fixed by a chuck of a coil spring manufacturing device, the cap may be crushed. Also, the cap may come off. Patent Literature 2 (JP 2012-117612 A) describes the technology of closing an opening at a distal end of a wire of a hollow coil spring by spinning. The distal end of the wire is formed to be hemispherical (in a dome shape) by the spinning.

When a coil spring is compressed, a torque about a coil axis is generated on an end turn portion of the coil spring. When the end turn portion arranged on a spring seat is rotated about the coil axis by the torque, a load axis (force line position) of the coil spring is shifted. A coil spring with a shifted load axis may not be able to fully play a predetermined role. Accordingly, in a coil spring for a suspension, rotation prevention means is provided in order to prevent the end turn portion from rotating. An example of the rotation prevention means is a step portion having a stopper wall formed on the spring seat. By bringing a distal end of a wire of the end turn portion into contact with the stopper wall, the end turn portion is prevented from being rotated.

In Patent Literature 2, a distal end of the end turn portion is formed in a semispherical shape by the spinning. Accordingly, when a torque which rotates the end turn portion is applied, the distal end of the end turn portion may ride across the stopper wall. When the distal end of the end turn portion rides across the stopper wall, the end turn portion is shifted from a normal position. If the position of the end turn portion is shifted, a load axis (force line position) of the coil spring is changed. Accordingly, there is a possibility that the coil spring cannot fully play a role required as a suspension coil spring. Also, when the end turn portion is rotated relative to the spring seat, abnormal sound may be generated by the friction between the spring seat and the end turn portion, or the spring seat is worn.

BRIEF SUMMARY OF THE INVENTION

Accordingly, an object of the present invention is to provide a hollow coil spring, which can prevent a distal end of an end turn portion from moving from a predetermined position relative to a spring seat, and also suppress damage to the spring seat, and a vehicle suspension comprising the hollow coil spring.

One embodiment of the present invention relates to a hollow coil spring constituted of a hollow wire wound helically, in which a terminal sealed portion is formed on an end portion of the wire. The terminal sealed portion has a rotationally symmetric shape in which an axis passing through the center of the wire is a symmetric axis, and comprises an end wall portion, an arc-shaped curved surface, and a closure portion in a cross section along the axis. The end wall portion includes an end face perpendicular to the axis. The arc-shaped curved surface is formed between the end face and an outer peripheral surface of the wire. The distal-end-center closure portion is formed on the axis at the center of the end wall portion. On an inner surface of the end wall portion, a recess of a rotationally symmetric shape existing on the axis may be included. A chamfering processing portion may be formed on an inner side or an outer side of a distal end portion of the wire in advance before the terminal sealed portion is formed. By forming the chamfering processing portion in advance, the recess as desired can be formed in forming the terminal sealed portion.

Spinning is performed for forming the terminal sealed portion of the present embodiment. Spinning is the processing which causes a heated wire to rotate about the axis, and brings a spinning jig into contact with an outer peripheral surface of the wire. While the spinning jig is moved in a direction along the axis toward a distal end of the wire, the spinning jig is moved toward the center of the wire. By repeating the spinning more than once, a distal end opening portion of the hollow wire is gradually spin-formed. Finally, the distal end opening portion of the wire is joined together on the axis (rotation center) and is formed as an integral part. In this way, the distal-end-center closure portion that is hermetically closed is formed.

Further, the spinning jig is moved in a radial direction of the wire. Alternatively, by a surface pressing jig which is different from the spinning jig, the terminal sealed portion is pressed in the direction along the axis. In this way, the end face is formed.

A vehicle suspension according to one embodiment comprises the hollow coil spring, and a spring seat supporting an end turn portion of the hollow coil spring. The end turn portion is arranged on the spring seat in such a state that the end face of the terminal sealed portion is opposed to the stopper wall. An example of the spring seat includes a metallic base member, and a nonmetallic sheet member such as a rubber sheet mounted on the base member, and the terminal sealed portion contacts the sheet member.

According to the hollow coil spring of the present invention, it is possible to prevent the end portion of the wire from riding across the stopper wall of the spring seat by the end face of the terminal sealed portion. A conventional general solid coil spring includes a cut surface obtained by cutting a distal end of a solid wire in a radial direction of the wire. For this reason, when a corner of the cut surface contacts the rubber sheet of the spring seat, a rubber sheet member may be damaged. In contrast, in the hollow coil spring of the present invention, since an arc-shaped curved surface is formed between the end face of the terminal sealed portion and the outer peripheral surface, even if the terminal sealed portion contacts a nonmetallic sheet member such as a rubber sheet, it is possible to suppress damage to the sheet member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hollow coil spring according to a first embodiment, and a vehicle suspension comprising this hollow coil spring will now be described with reference to FIGS. 1 to 7.

Figure 1:
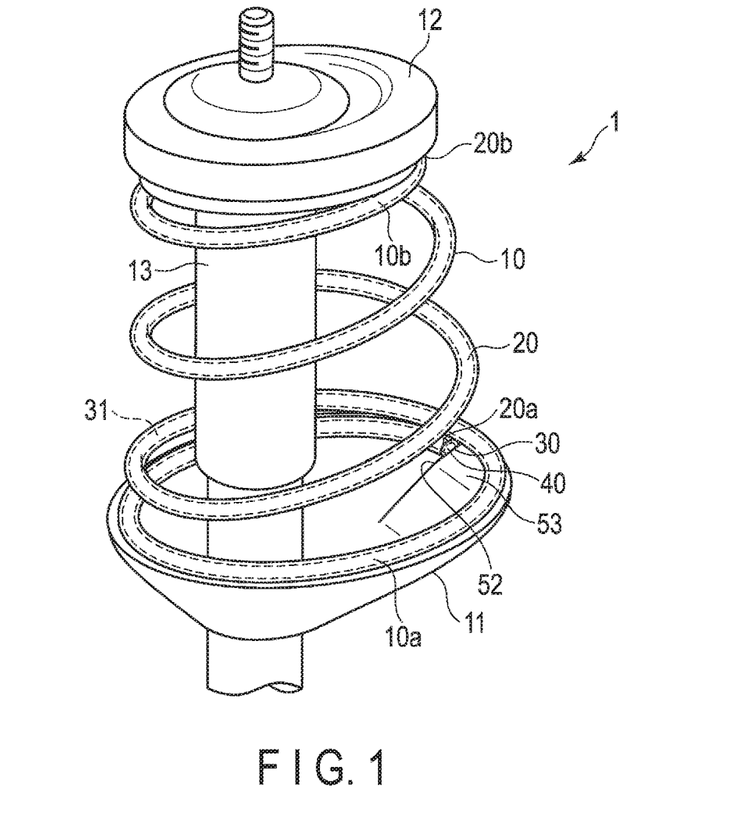
FIG. 1 is a perspective view showing a part of a suspension for a vehicle comprising a hollow coil spring according to a first embodiment.

FIG. 1 shows a part of a McPherson-strut-type suspension 1, as an example of a vehicle suspension. The suspension 1 of the present embodiment comprises a hollow coil spring 10, a lower spring seat 11, an upper spring seat 12, and a shock absorber 13. The lower spring seat 11 supports a lower end turn portion 10a of the hollow coil spring 10. The upper spring seat 12 supports an upper end turn portion 10b of the hollow coil spring 10. The shock absorber 13 functions as a strut. The hollow coil spring 10 may be used for a suspension other than the McPherson-strut-type suspension.

The hollow coil spring 10 shown in FIG. 1 is fitted to a vehicle body in such a state that it is compressed between the lower spring seat 11 and the upper spring seat 12 (i.e., a state in which a preload is applied). The hollow coil spring 10 elastically supports a load applied from above in the vehicle body.

The hollow coil spring 10 is compressed between the spring seats 11 and 12 in accordance with the magnitude of the load. Accordingly, a distance between the spring seats 11 and 12 is varied in accordance with the load.

The hollow coil spring 10 of the present embodiment includes a hollow element wire (hollow wire) 20 that is helically formed (coiled). The wire 20 is made of spring steel. The specific shape of the hollow coil spring 10 is not limited to cylindrical, and the hollow coil spring 10 may be formed variously as, for example, a barrel-shaped coil spring, an hourglass coil spring, a tapered coil spring, a variable pitch coil spring, and springs of the other shapes.

A material of the wire 20 is a steel material for a spring processed by hot working (for example, in a temperature range in which steel is austenitized). Although a type of the steel material is not particularly limited, a steel material for a general suspension coil spring, for example, may be used. Apart from the spring steel, high-strength steel or steel for carburizing, for example, may be used. Alternatively, in some cases, low-carbon steel having a carbon concentration of approximately 0.15 to 0.60 wt % may be used. In other words, various steel materials can be applied.

On both ends of the hollow coil spring 10, more specifically, end portions 20a and 20b of the wire 20, terminal sealed portions 30 are formed, respectively. The terminal sealed portions 30 are formed in advance by a spinning apparatus 60 before the wire 20 is formed (coiled) helically.

Figure 2:
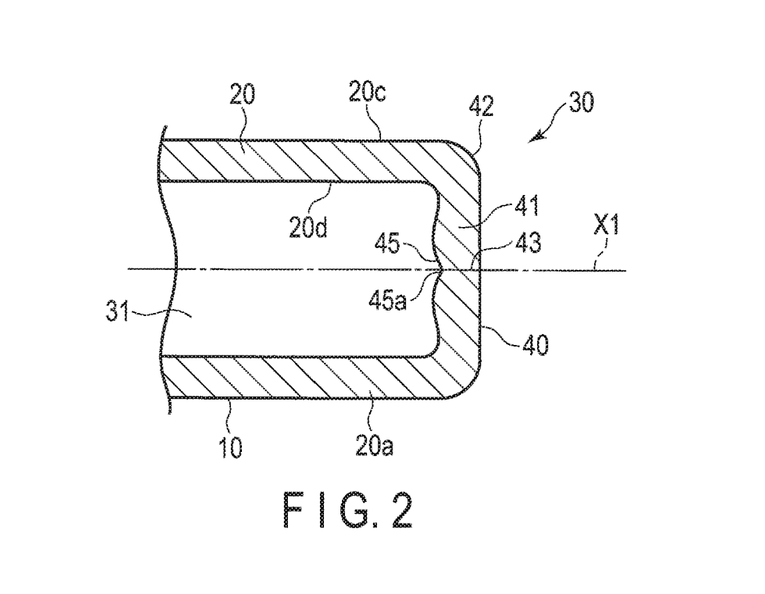
FIG. 2 is a cross-sectional view of an end portion of the hollow coil spring of the suspension shown in FIG. 1.
Figure 3:
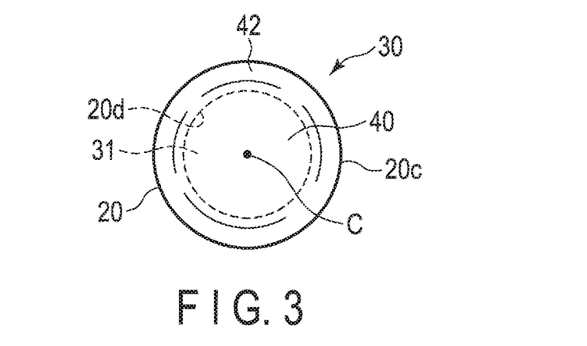
FIG. 3 is a front view of the end portion of the hollow coil spring shown in FIG. 2.

FIG. 2 shows a cross section of the terminal sealed portion 30 along an axis. FIG. 3 is a front view of the terminal sealed portion 30 shown in FIG. 2. A cross section obtained in a radial direction perpendicular to an axis X1 of the wire 20 is circular. As shown in FIG. 2, the terminal sealed portion 30 has a rotationally symmetric shape in which the axis X1 passing through a center C (FIG. 3) of the wire 20 is a symmetric axis. More specifically, the terminal sealed portion 30 has such a shape that its cross section along the axis X1 does not change even if the terminal sealed portion 30 is rotated by an arbitrary angle about the axis X1. The cross section along the axis X1 is intended as a cross section obtained in a longitudinal direction passing through the center C (axis X1) of the wire 20. Inside the wire 20, an enclosed space 31 is formed.

The terminal sealed portion 30 includes an end wall portion 41, and an arc-shaped curved surface 42. The end wall portion 41 includes a substantially flat end face 40. The end face 40 is perpendicular to the axis X1 (symmetric axis). The arc-shaped curved surface 42 is formed in an arc shape between an outer peripheral surface 20c of the wire 20 and the end face 40. The arc-shaped curved surface 42 connects between the outer peripheral surface 20c of the wire 20 and the end face 40 by forming a smooth curved surface. An inner surface 20d of the wire 20 has a rotationally symmetric shape in which the axis X1 is the symmetric axis, likewise the outer peripheral surface 20c. On the axis X1 at the center of the end wall portion 41, a distal-end-center closure portion 43 is formed. A distal end (distal end opening portion) 20e of the hollow wire 20 is converged toward the axis X1 by the spinning. As the distal end (distal end opening portion) 20e of the wire 20 subjected to spinning merges on the axis X1 to be joined together and formed as an integral part, the distal-end-center closure portion 43 is formed. The distal end 20e of the hollow wire 20 is hermetically sealed at the distal-end-center closure portion 43. On an inner surface of the end wall portion 41, a recess 45 having a rotationally symmetric shape in which the axis X1 is the symmetric axis is formed. The center of the recess 45 (i.e., a distal end 45a of the recess 45) is located on the axis X1 (symmetric axis), likewise the distal-end-center closure portion 43.

Figure 4:
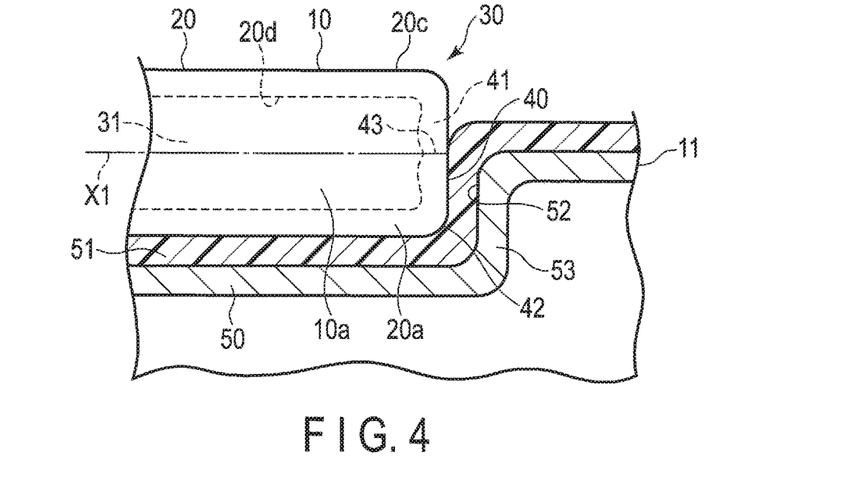
FIG. 4 is a cross-sectional view of a part of the suspension shown in FIG. 1.

FIG. 4 shows a part of the suspension 1 shown in FIG. 1. FIG. 4 shows a part of the lower spring seat 11 and the terminal sealed portion 30. The spring seat 11 includes a metallic base member 50, and a nonmetallic sheet member 51. The sheet member 51 is arranged on the base member 50. The sheet member 51 is formed of a non-metal material such as a rubber sheet. The sheet member 51 may be made of a synthetic resin.

A step portion 53 is formed on the spring seat 11. The step portion 53 comprises a stopper wall 52. The stopper wall 52 has the function of restricting a position of the end turn portion 10a of the hollow coil spring 10. The end face 40 of the terminal sealed portion 30 is arranged to be opposed to the stopper wall 52 of the spring seat 11. A position of the end face 40 of the terminal sealed portion 30 is restricted by the stopper wall 52. In this way, positioning of the end turn portion 10a is determined, and rotation of the end turn portion 10a about a coil axis is suppressed. In the upper spring seat 12, a step portion for keeping the upper end turn portion 10b at a predetermined position may be formed.

The terminal sealed portion 30 of the hollow coil spring 10 of the present embodiment includes a substantially flat end face 40. The end face 40 is perpendicular to the axis X1. The end face 40 is opposed to the stopper wall 52 of the spring seat 11. When a torque about the coil axis acts on the end turn portion 10a, the flat end face 40 abuts on the stopper wall 52. In this way, since the movement of the terminal sealed portion 30 riding across the step portion 53 can be restrained, the position of the end turn portion 10a is stabilized. As the position of the end turn portion 10a is stabilized, it is possible to prevent a load axis of the hollow coil spring 10 from being varied. Moreover, since it is possible to prevent the end turn portion 10a from being rotated about the coil axis with respect to the spring seat 11, it is possible to prevent occurrence of abnormal sound caused by friction, and prevent the spring seat 11 from being worn.

The arc-shaped curved surface 42 is formed between the end face 40 and the outer peripheral surface 20c. The terminal sealed portion 30 has a rotationally symmetric shape in which the axis X1 is the symmetric axis. Whichever rotation position the end portion 20a of the wire 20 twisted at the time of coiling is at about the axis X1, the arc-shaped curved surface 42 can be in contact with the sheet member 51. Accordingly, even if the end portion 20a of the wire 20 comes into contact with a relatively soft sheet member 51, such as a rubber sheet or a resin sheet, damage to the sheet member 51 can be suppressed by virtue of the arc-shaped curved surface 42.

Figure 5:
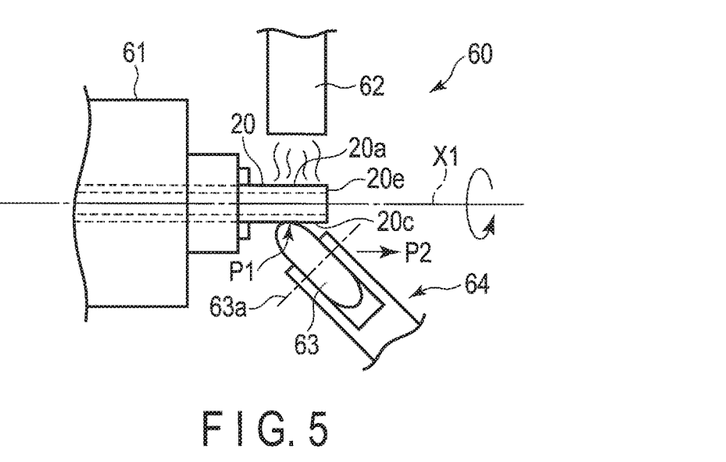
FIG. 5 is a side view schematically showing a part of a spinning apparatus.
Figure 6:
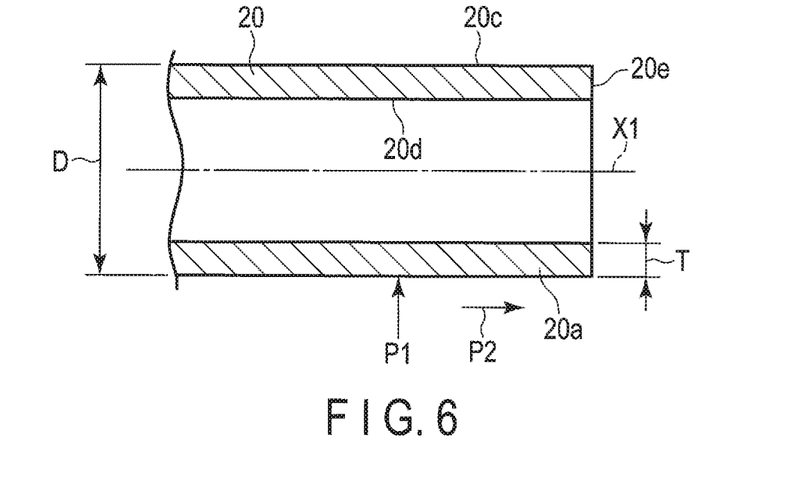
FIG. 6 is a cross-sectional view showing an example of an end portion of a wire before a terminal sealed portion is formed.

FIG. 5 is a side view schematically showing a part of a spinning apparatus 60. By the spinning apparatus 60, the terminal sealed portion 30 is formed at the end portion 20a of the wire (hollow wire) 20. FIG. 6 is a cross-sectional view of the wire 20 before the terminal sealed portion 30 is formed. An example of an outside diameter D of the wire 20 is 419 mm, and an example of a thickness T is 3 mm. The wire 20 has a rotationally symmetric shape in which the axis X1 is the symmetric axis.

The spinning apparatus 60 shown in FIG. 5 includes a lathe 61, heating means 62, and a spinning mechanism 64. The lathe 61 chucks the wire 20, and rotates the wire 20 about the axis X1. The heating means 62 heats the end portion 20a of the wire 20. The spinning mechanism 64 comprises a roller-shaped spinning jig 63. An example of the heating means 62 is a gas burner. A preferred another example of the heating means 62 is a high-frequency induction heating coil. In order to heat the end portion 20a of the wire 20, using the high-frequency induction heating coil is recommended. In a state in which the spinning jig 63 is in contact with the wire 20 that is rotating, the spinning jig 63 is driven to rotate about a rotational axis 63a.

The end portion 20a of the wire 20 is rotated by the lathe 61. The end portion 20a of the rotating wire 20 is heated to, for example, austenitizing temperature, by the heating means 62. The heated wire 20 glows red, and has softness suitable for processing. The heated wire 20 is rotated about the axis X1 by the lathe 61. A distal end of the spinning jig 63 is made to contact the outer peripheral surface 20c of the end portion 20a of the wire 20 that is heated and rotated in this way. The distal end of the spinning jig 63 is brought to contact a spinning start point P1 (FIGS. 5 and 6), which is tens of millimeters (for example, 20 mm) away from the distal end (distal end opening portion) 20e of the wire 20. Further, the spinning jig 63 is moved in a direction indicated by arrow P2 (i.e., a direction along the axis X1). Simultaneously with the above, the spinning jig 63 is moved in a radial direction of the wire 20 toward the axis X1.

By such movement of the spinning jig 63, the distal end (distal end opening portion) 20e of the wire 20 is plastically flowed such that it is gathered toward the axis X1 from the outer peripheral surface 20c. Further, the distal end (distal end opening portion) 20e of the wire 20 is spin-formed such that the diameter of the distal end (distal end opening portion) 20e of the wire 20 is gradually reduced. The above spinning is performed several times before the temperature of the wire 20 is dropped excessively. By doing so, the distal end 20e of the spin-formed wire 20 is joined together on the axis X1 and is formed as an integral part. As a result, the distal-end-center closure portion 43 that is sealed is formed at the end wall portion 41.

Figure 7:
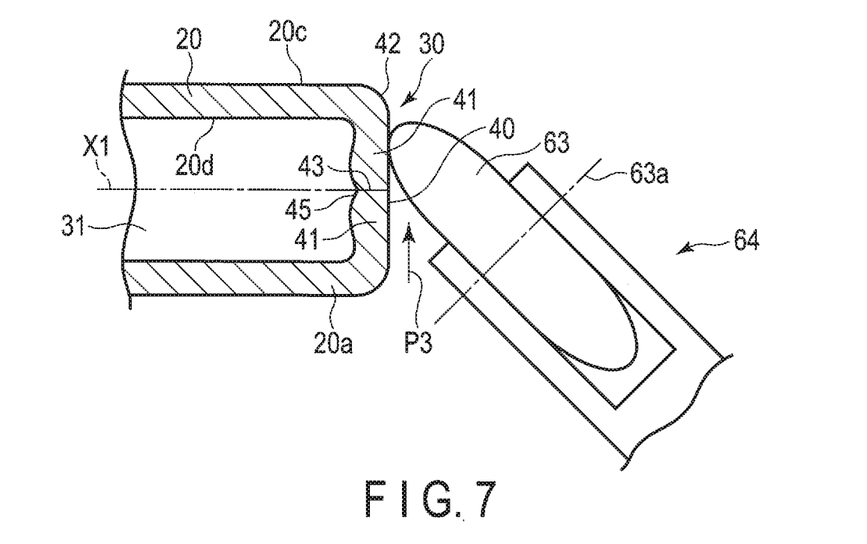
FIG. 7 is a cross-sectional view showing a spinning jig of the spinning apparatus shown in FIG. 5 and the end portion of the wire.

Further, as shown in FIG. 7, the spinning jig 63 is moved in a direction perpendicular (normal) to the axis X1 (i.e., a direction indicated by arrow P3). By this movement, the end face 40 which is substantially perpendicular to the axis X1, and has become flattened is formed. The distal-end-center closure portion 43 exists on the axis X1 at the center of the end wall portion 41. The distal-end-center closure portion 43 is hermetically closed by the spinning. Accordingly, it is possible to prevent fluid such as water, oil, and gas, from entering inside the enclosed space 31 through the distal-end-center closure portion 43, from outside the end wall portion 41.

The end face 40 and the arc-shaped curved surface 42 of the terminal sealed portion 30 are formed when the terminal sealed portion 30 is formed by the spinning apparatus 60. More specifically, the end face 40 and the arc-shaped curved surface 42 can be formed in accordance with a locus of movement of the spinning jig 63 during the spinning. Accordingly, there is no need to separately add a different step such as machining for forming the end face 40 and the arc-shaped curved surface 42. On the inner surface of the end wall portion 41, the recess 45 having the rotationally symmetric shape in which the axis X1 is the symmetric axis is formed. By subjecting the distal end (distal end opening portion) 20e of the wire 20 to spinning by the spinning jig 63, the distal-end-center closure portion 43 is formed on the axis X1. Since the recess 45 having a rotationally symmetrical shape in which the axis X1 is at the center is formed on the inner side of the end wall portion 41, the work of forming the distal-end-center closure portion 43 on the axis X1 can be carried out relatively easily.

On the end portions 20a and 20b of the wire 20, the terminal sealed portions 30 are formed, respectively. After that, by winding the wire 20 helically by a coil spring manufacturing device, the coil spring 10 is formed. An example of the coil spring manufacturing device comprises a mandrel which rotates, a rotational head portion, a chuck configured to fix a distal end of the wire onto the rotational head portion, a guide which guides the wire, and the like. The distal end (terminal sealed portion 30) of the wire 20 is fixed to the rotational head portion by the chuck. By moving the guide in an axial direction of the mandrel while the mandrel is being rotated, the wire 20 is wound around the mandrel at a predetermined pitch. More specifically, the coil spring 10 is formed helically by hot working.

In the terminal sealed portion 30 at the distal end of the wire 20, the end wall portion 41 having the end face 40 that is perpendicular to the axis X1 is formed. The terminal sealed portion 30 having the end wall portion 41 can exhibit great stiffness against a load applied in the radial direction of the wire 20. Accordingly, when the terminal sealed portion 30 is clamped by the chuck of the coil spring manufacturing device, it is possible to prevent the terminal sealed portion 30 from being crushed or deformed. Accordingly, the wire 20 can be wound around the mandrel in a state in which the shape of the terminal sealed portion 30 is maintained.

Figure 8:
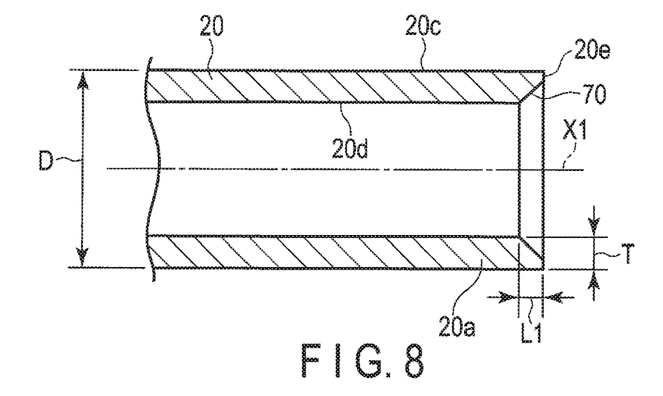
FIG. 8 is a cross-sectional view showing an example of a wire including a chamfered portion on an inner side of the end portion.

FIG. 8 shows an example in which a chamfered portion 70 is formed on an inner side of the end portion 20a of the wire 20. When the wire 20 has the outside diameter D of 419 mm, and the thickness T of 3 mm, a length L1 of the chamfered portion 70 is set to 2 mm. The chamfered portion 70 may have a length other than the above. The terminal sealed portion 30 as shown in FIG. 2 may be formed by performing the spinning on the end portion 20a of the wire 20, which has the chamfered portion 70 on the inner side of the wire 20 as in this example, by the spinning apparatus 60 shown in FIG. 5.

Figure 9:
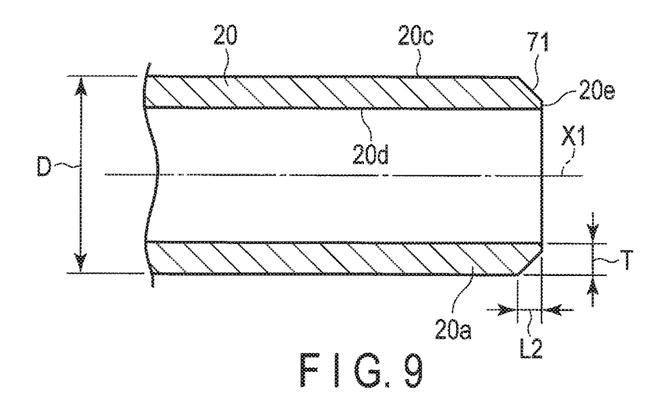
FIG. 9 is a cross-sectional view showing an example of a wire including a chamfered portion on an outer side of the end portion.

FIG. 9 shows an example in which a chamfered portion 71 is formed on an outer side of the end portion 20a of the wire 20. When the wire 20 has the outside diameter D of 19 mm, and the thickness T of 3 mm, a length L2 of the chamfered portion 71 is set to 2 mm. The chamfered portion 71 may have a length other than the above. The terminal sealed portion 30 as shown in FIG. 2 may be formed by performing the spinning on the end portion 20a of the wire 20, which has the chamfered portion 71 on the outer side of the wire 20 as in this example, by the spinning apparatus 60 shown in FIG. 5.

Figure 10:
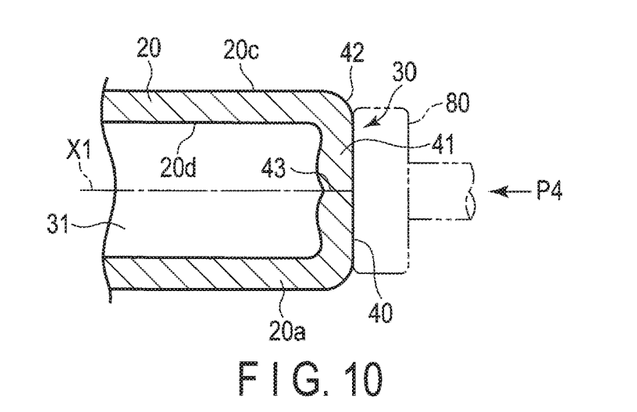
FIG. 10 is a cross-sectional view showing the end portion of the wire and a surface pressing jig.

FIG. 10 shows a surface pressing jig 80 used as the other means for forming the end face 40. The surface pressing jig 80 is pressed against the end wall portion 41 in the direction along the axis X1 (i.e., a direction indicated by arrow P4 in FIG. 10). In some cases, a substantially flat end face 40 may be formed by the surface pressing jig 80.

Figure 11:
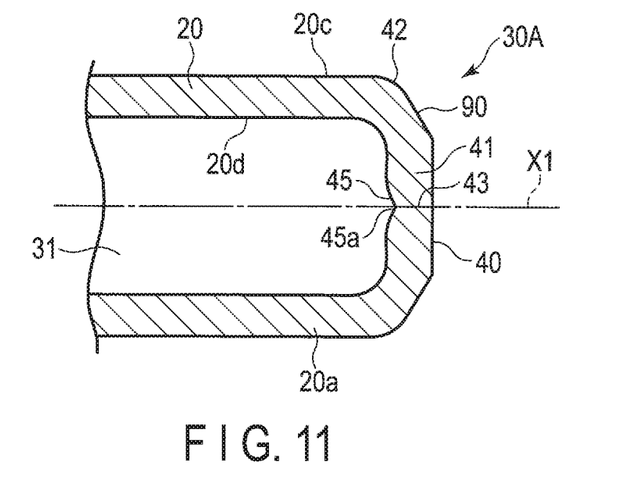
FIG. 11 is a cross-sectional view of a terminal sealed portion according to a second embodiment.

FIG. 11 shows a cross section of a terminal sealed portion 30A according to a second embodiment. The terminal sealed portion 30A also has a rotationally symmetric shape in which an axis X1 of a wire 20 is the symmetric axis, likewise the terminal sealed portion 30 of the first embodiment. More specifically, the terminal sealed portion 30A includes an end wall portion 41, an arc-shaped curved surface 42, a distal-end-center closure portion 43, and a recess 45 in a cross section along the axis X1 (symmetric axis). The end wall portion 41 includes an end face 40 perpendicular to the axis X1. The arc-shaped curved surface 42 is contiguous with the end face 40 and an outer peripheral surface 20c. The distal-end-center closure portion 43 is formed on the axis X1 at the center of the end wall portion 41. Further, the terminal sealed portion 30A includes a tapered portion 90 formed between the end face 40 and the arc-shaped curved surface 42.

Figure 12:
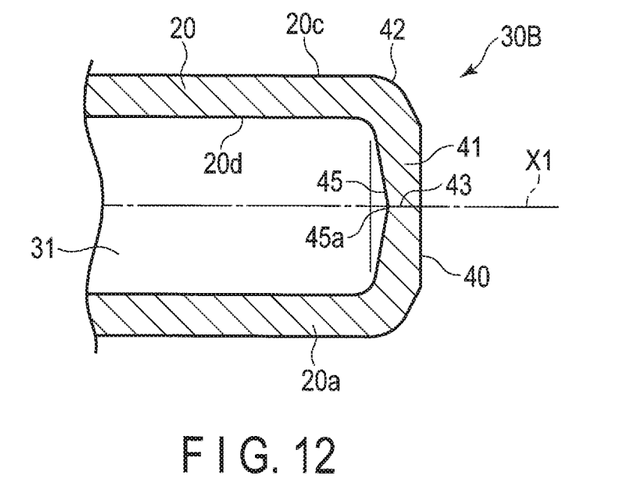
FIG. 12 is a cross-sectional view of a terminal sealed portion according to a third embodiment.

FIG. 12 shows a cross section of a terminal sealed portion 30B according to a third embodiment. The terminal sealed portion 30B also forms a rotationally symmetric shape in which an axis X1 of a wire 20 is the symmetric axis. More specifically, the terminal sealed portion 30B includes an end wall portion 41, an arc-shaped curved surface 42, a distal-end-center closure portion 43, and a recess 45 in a cross section along the axis X1 (symmetric axis). The end wall portion 41 includes an end face 40 perpendicular to the axis X1. The arc-shaped curved surface 42 is contiguous with the end face 40 and an outer peripheral surface 20c. The distal-end-center closure portion 43 is formed on the axis X1 at the center of the end wall portion 41.

Needless to say, in carrying out the present invention, not only the specific-shape and arrangement of the hollow coil spring, but also the position and shape of the terminal sealed portion, and the shape, arrangement, etc., of the upper spring seat and the lower spring seat which constitute the suspension may be modified variously. The hollow coil spring of the present invention can be applied to a suspension for a vehicle other than cars, and can also be used for a suspension other than the McPherson-strut-type suspension.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A vehicle suspension comprising:
a hollow coil spring constituted of a hollow wire wound helically, the hollow coil spring comprising an end turn portion; and
a spring seat supporting the end turn portion, the spring seat comprising a metallic base member including a stopper wall and a nonmetallic sheet member mounted on the base member,
wherein:
the hollow coil spring includes terminal sealed portions formed at both end portions of the wire,
each of the terminal sealed portions has a rotationally symmetric shape in which an axis passing through a center of the wire is a symmetric axis,
in a cross section along the axis, each of the terminal sealed portions comprises:

an end wall portion including a flat end face which is perpendicular to the axis and substantially flat;

an arc-shaped curved surface formed between the flat end face and an outer peripheral surface of the wire, wherein the arc-shaped curved surface is a smooth curved surface connecting the flat end face and the outer peripheral surface of the wire; and a hermetically closed distal-end-center closure portion located on the axis at a center of the end wall portion, the hollow coil spring includes, in each of the terminal sealed portions, a recess having a rotationally symmetric shape and located on the axis, on an inner surface of the end wall portion of the terminal sealed portion, a thickness of the distal-end-center closure portion of each of the terminal sealed portions is less than a thickness at a part surrounding the distal-end-center closure portion, the hollow coil spring has a sealed enclosed space inside the wire, the end turn portion is arranged on the spring seat in such a state that the flat end face of the end turn portion is opposed to the stopper wall and the hermetically closed distal-end-center closure portion of one of the terminal sealed portions that is in the end turn portion is supported by the stopper wall of the spring seat in such a state that the end wall portion is in contact with the nonmetallic sheet member, and the flat end face of the end turn portion comprises a lower portion that includes the distal-end-center closure portion and is supported by the stopper wall, and an upper portion that is exposed at an upper side of the stopper wall.

2. The vehicle suspension of claim 1, wherein the arc-shaped curved surface of the one of the terminal sealed portions that is in the end turn portion is in contact with the nonmetallic sheet member, and damage to the sheet member is suppressed by the arc-shaped curved surface.

* * * * *